United States Patent [19]
Lee

[11] Patent Number: 5,890,705
[45] Date of Patent: Apr. 6, 1999

[54] SELF-CENTERING LIQUID SPRING ASSEMBLY AND CONSTRUCTIONS THEREOF

[75] Inventor: David A. Lee, Santa Monica, Calif.

[73] Assignee: Tayco Developments, Inc., North Tonawanda, N.Y.

[21] Appl. No.: 531,036

[22] Filed: Sep. 20, 1995

[51] Int. Cl.⁶ .................................................. F16F 1/00
[52] U.S. Cl. .................... 267/150; 267/64.11; 267/64.13
[58] Field of Search .................. 267/150, 64.13, 267/64.11, 64.26; 213/19–21, 43

[56] References Cited

U.S. PATENT DOCUMENTS

| | | | |
|---|---|---|---|
| 2,469,118 | 5/1949 | Kinne et al | 213/19 |
| 3,011,656 | 12/1961 | Metzger | 213/19 |
| 3,438,512 | 4/1969 | Metzger et al. | 213/19 |
| 3,556,313 | 1/1971 | Albanese | 213/20 |
| 3,561,612 | 2/1971 | Laboda | 213/12 |
| 3,722,640 | 3/1973 | Taylor | 188/316 |
| 3,907,122 | 9/1975 | Ksienysk et al. | 213/14 |
| 3,933,344 | 1/1976 | Taylor | 267/64 A |
| 4,029,304 | 6/1977 | Savaguchi | 267/64.15 |
| 4,277,045 | 7/1981 | Bargeron | 248/599 |
| 4,582,303 | 4/1986 | Taylor | 267/64.13 |
| 4,611,794 | 9/1986 | Taylor | 267/64.13 |
| 4,630,805 | 12/1986 | Taylor | 267/64.13 |
| 4,892,051 | 1/1990 | Taylor et al. | 114/1 |

*Primary Examiner*—Robert J. Oberleitner
*Assistant Examiner*—C. T. Bartz
*Attorney, Agent, or Firm*—Joseph P. Gastel

[57] ABSTRACT

A self-centering spring assembly including a liquid spring having a cylinder and a piston, a casing slidably mounted on the cylinder and having the outer end of the piston connected thereto, a first pivotal connector between an extension of the cylinder and a bracket member and a second pivotal connection between a member extending laterally of the casing and an external member, the second pivotal connection lying outwardly of the first pivotal connection.

The foregoing basic structure plus a liquid spring axially mounted thereon. The foregoing basic structure plus a resilient rubber sleeve mounted between the liquid spring and an external sleeve which supports a member.

32 Claims, 8 Drawing Sheets

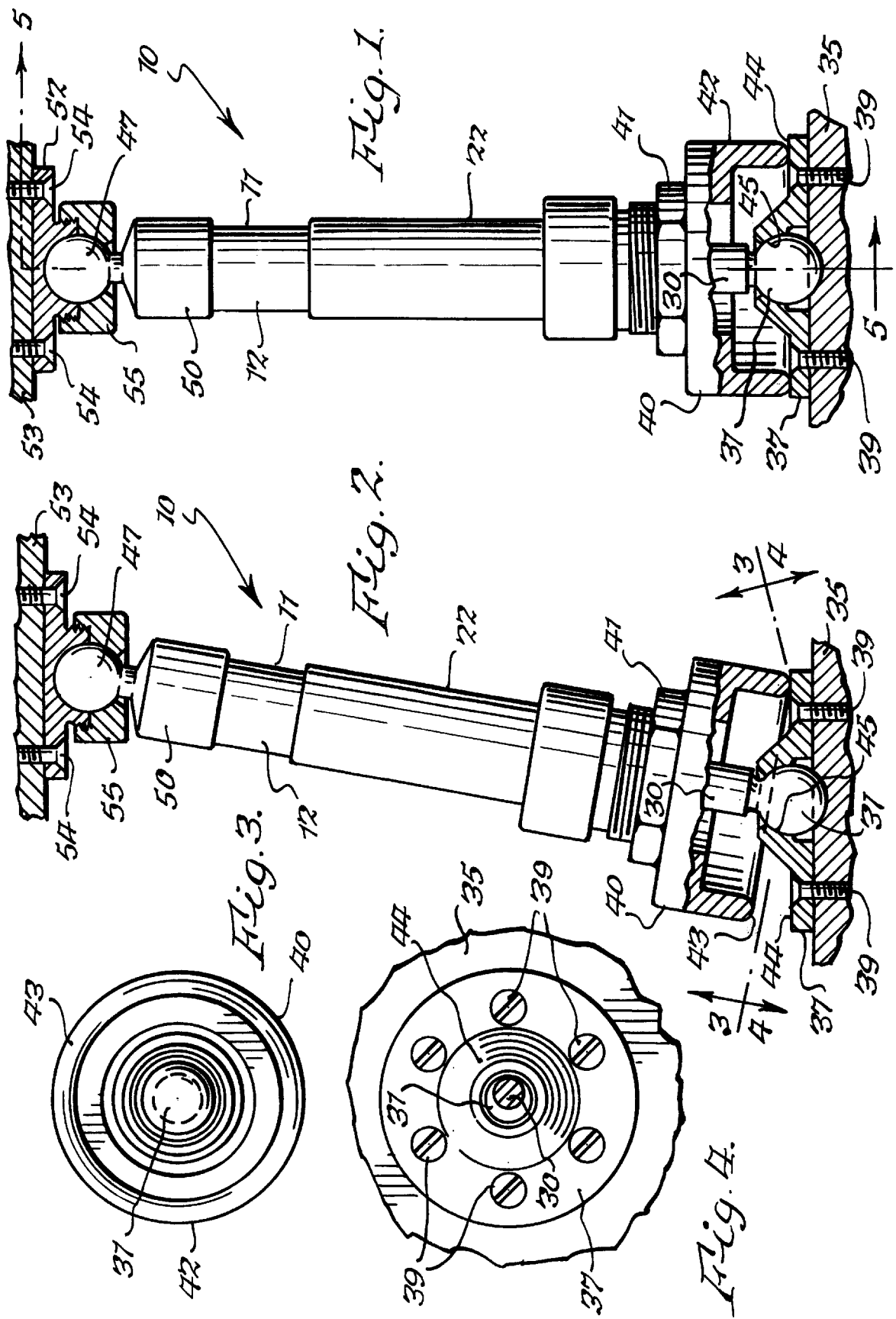

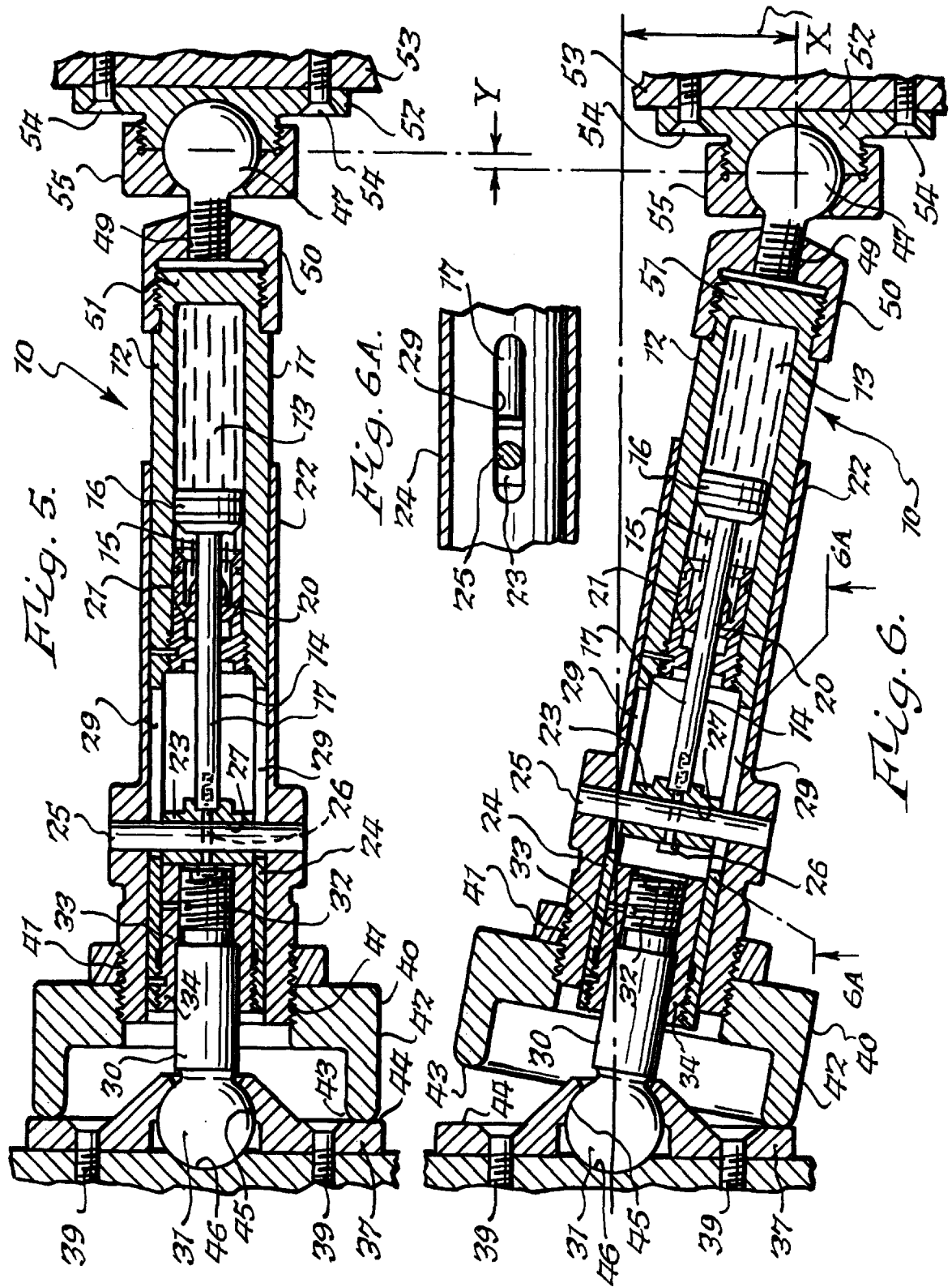

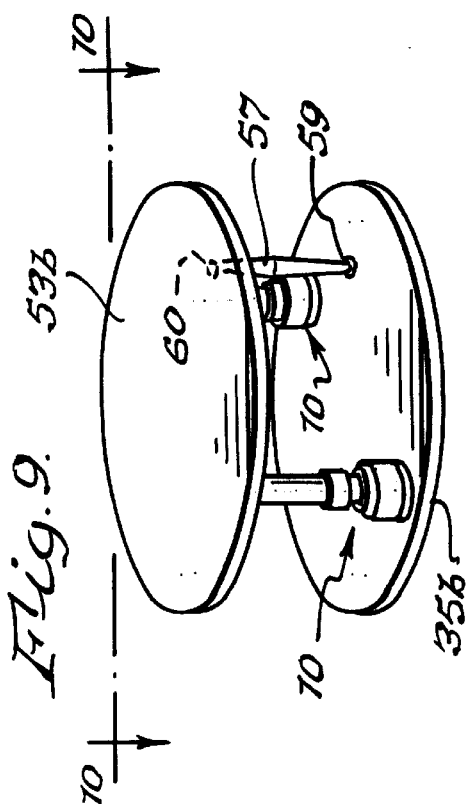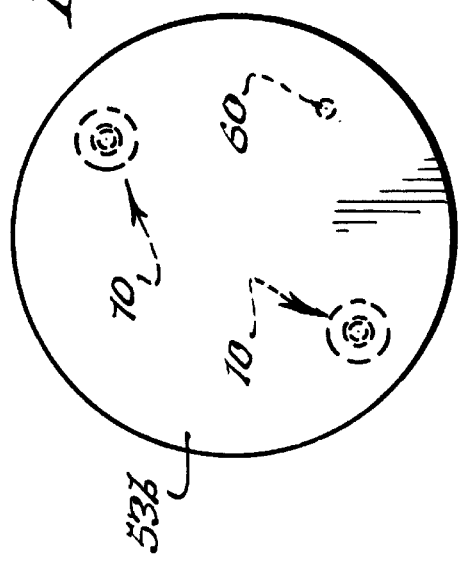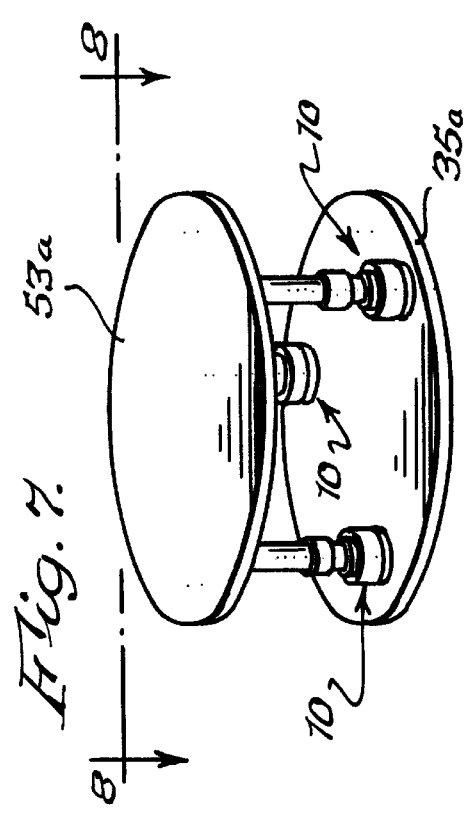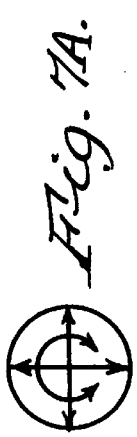

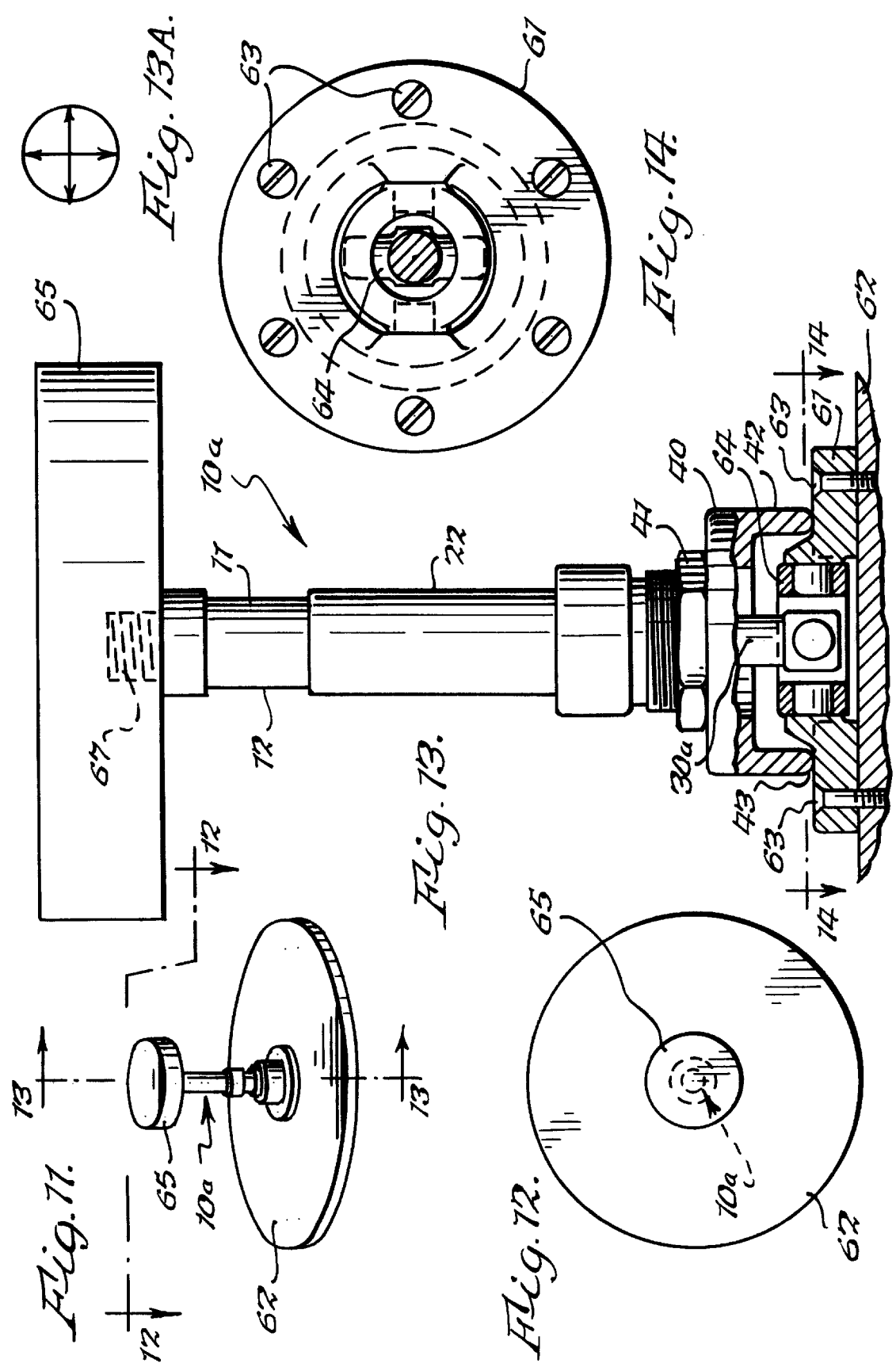

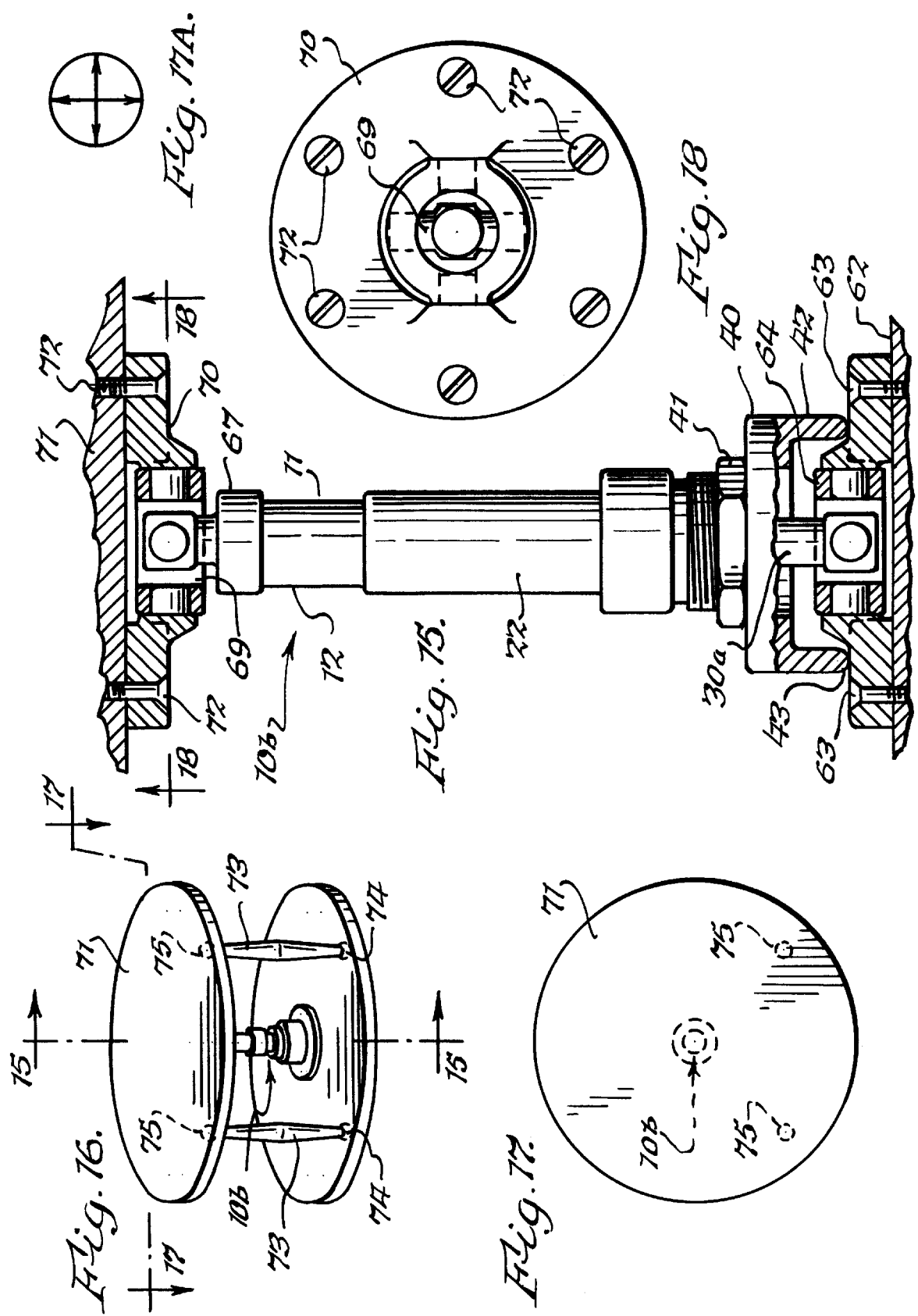

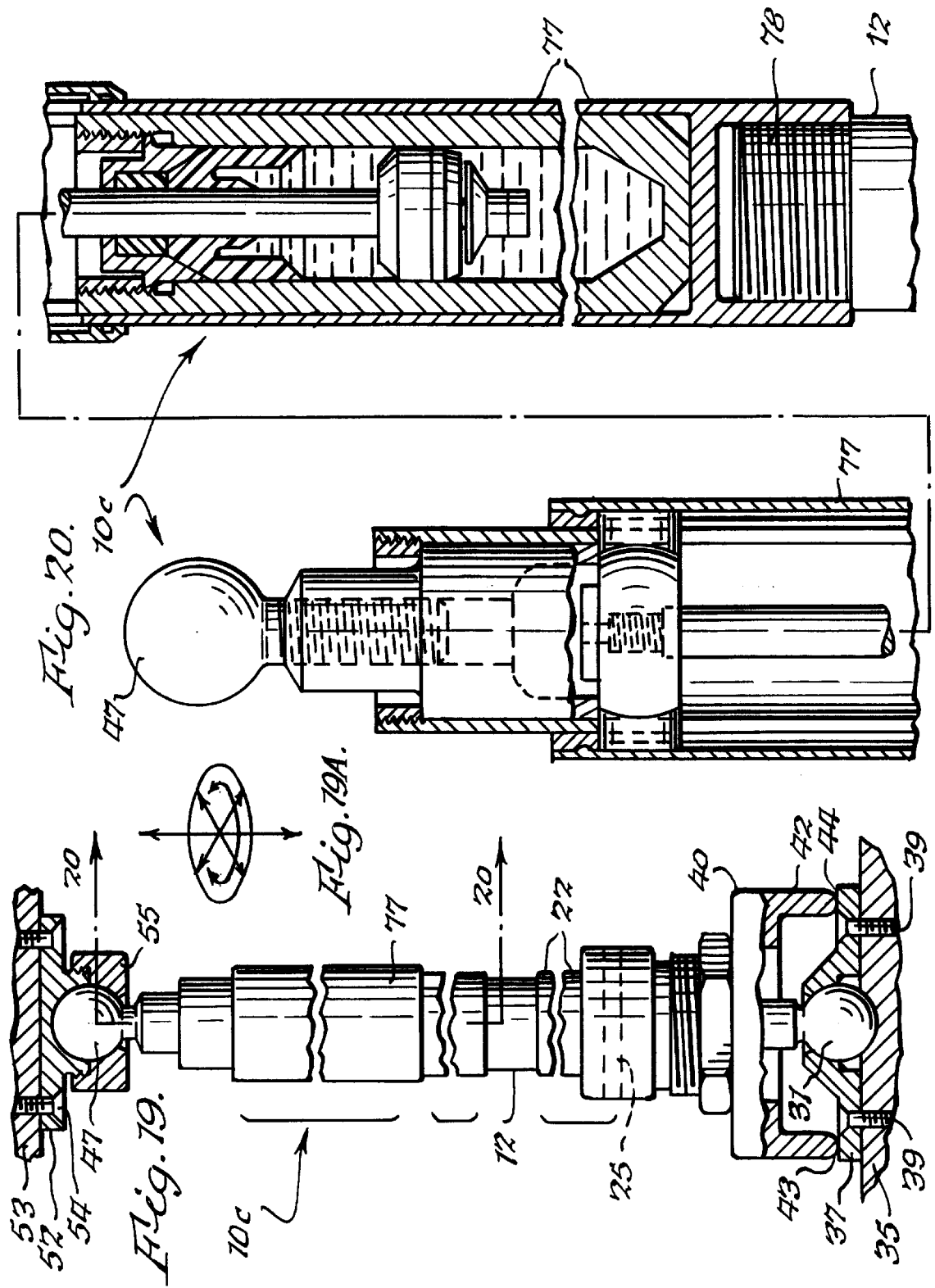

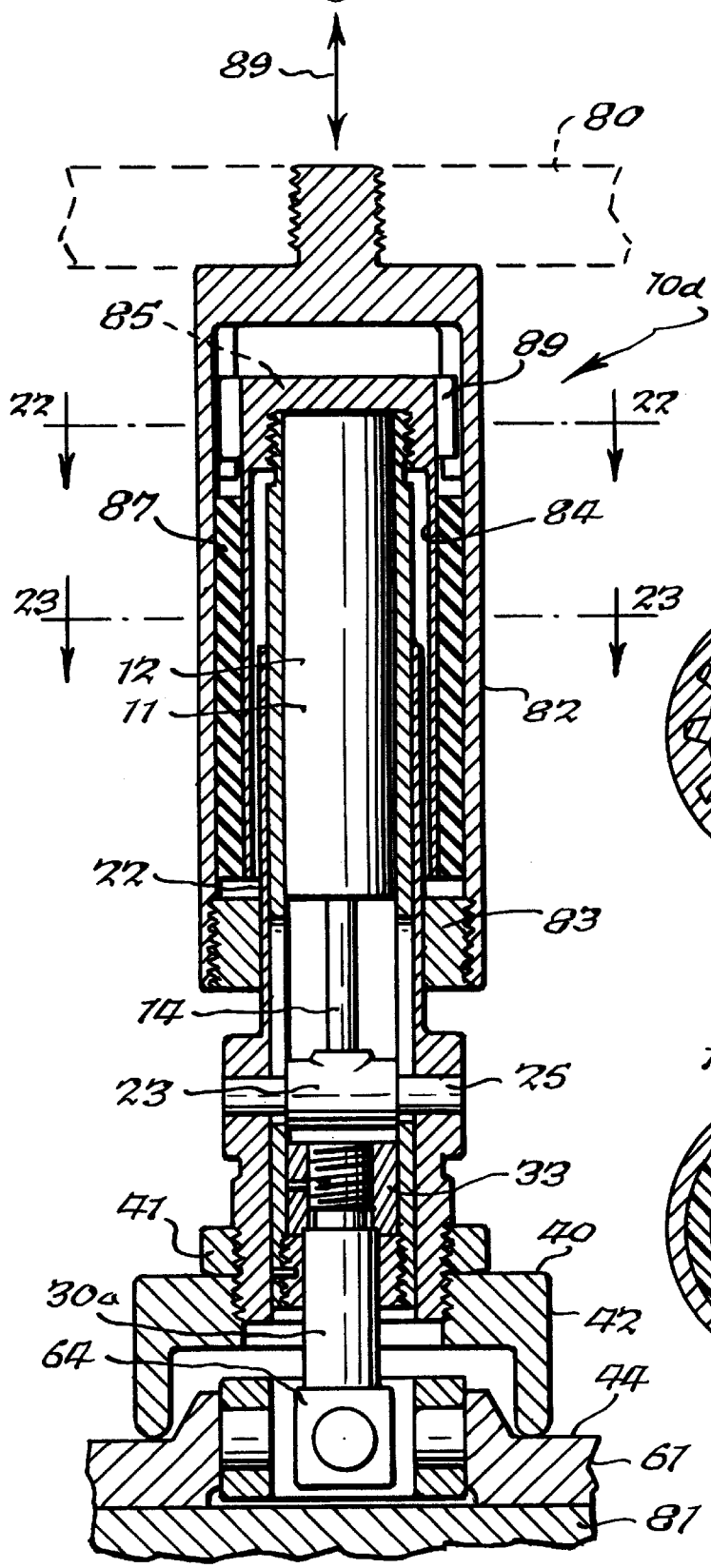
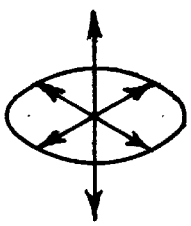
Fig.21.
Fig.21A.
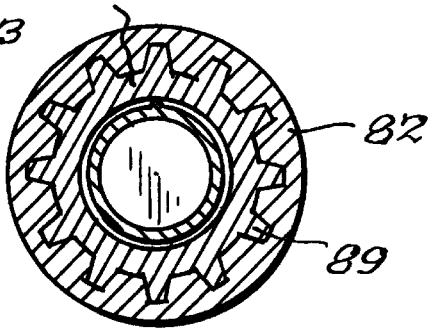
Fig.22.
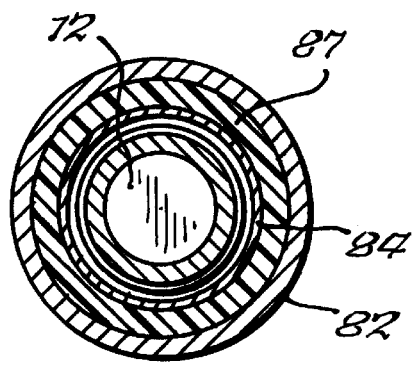
Fig.23.

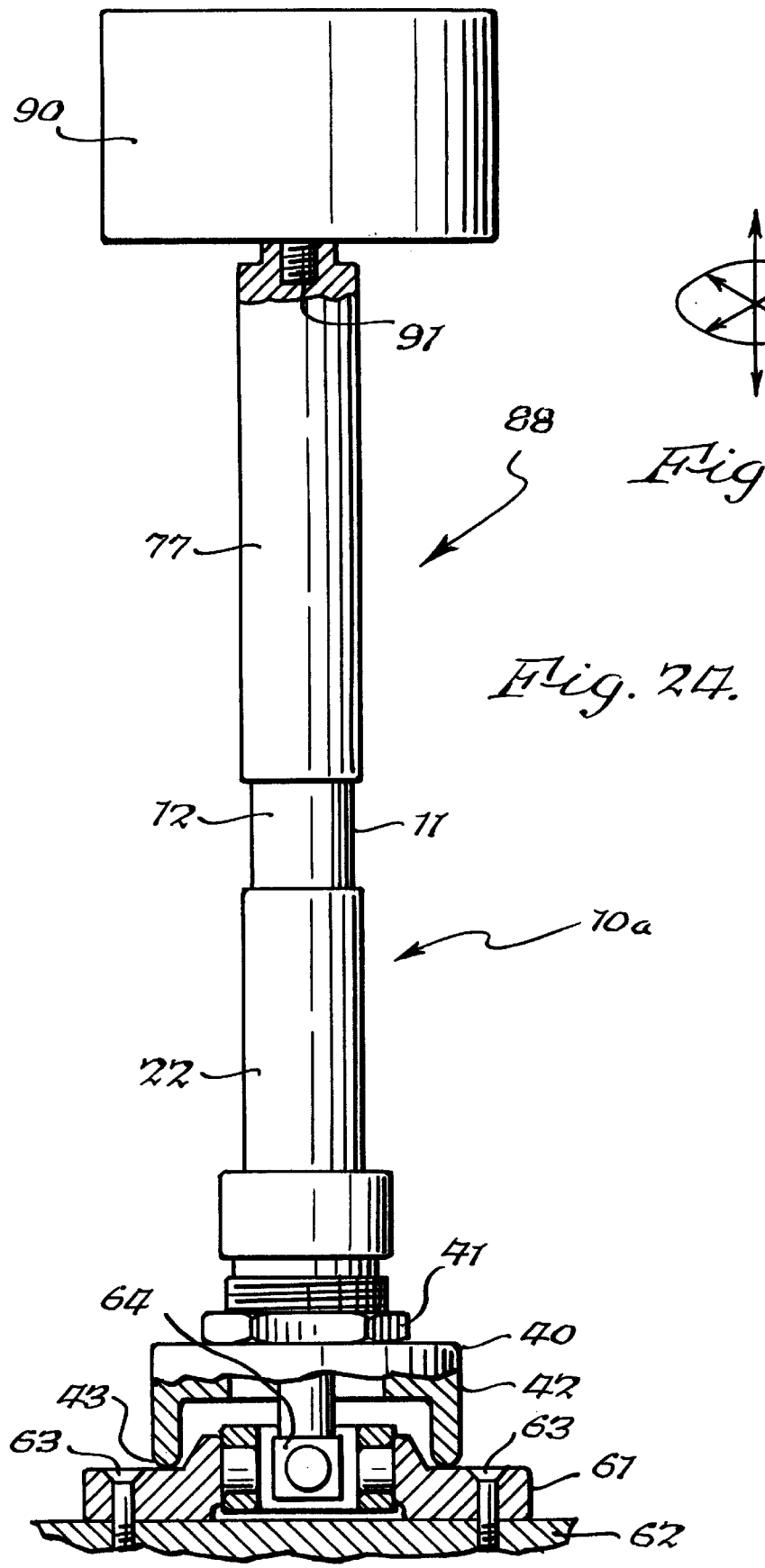

SELF-CENTERING LIQUID SPRING ASSEMBLY AND CONSTRUCTIONS THEREOF

BACKGROUND OF THE INVENTION

The present invention relates to an improved self-centering spring assembly and to constructions containing at least one such assembly.

By way of background, self-centering spring units are known, one of which is disclosed in prior U.S. Pat. No. 3,438,512. It is with an improved self-centering spring assembly and constructions containing such assembly that the present invention is concerned.

SUMMARY OF THE INVENTION

It is accordingly one object of the present invention to provide an improved self-centering spring assembly utilizing a liquid spring structure.

Another object of the present invention is to provide an improved self-centering spring assembly utilizing a liquid spring which will permit pivotal action of a supported body about the longitudinal axis of the self-centering spring.

A further object of the present invention is to provide a self-centering liquid spring assembly which will provide a self-centering action to a supported body but will prevent relative pivotal movement of the supported body about the longitudinal axis about the self-centering spring assembly.

Yet another object of the present invention is to provide an improved self-centering spring assembly which not only permits a supported body to be returned to a centered position when it is moved laterally but also returns it to an original position after it has been moved axially relative to the self-centering spring assembly.

A still further object of the present invention is to provide self-centering constructions utilizing one or more self-centering spring assemblies of the present invention. Other objects and attendant advantages of the present invention will readily be perceived hereafter.

The present invention relates to a self-centering spring assembly comprising a liquid spring including a cylinder, first and second ends on said cylinder, a piston, a first portion of said piston in said cylinder, a second portion of said piston extending outwardly beyond said first end of said cylinder, a casing slidably mounted on said cylinder, a connection between said second portion of said piston and said casing, a cylinder extension on said cylinder extending beyond said first end of said cylinder, a base member, a first pivotal connection between said base member and said cylinder extension, and a second pivotal connection on said cylinder extension located outwardly of said first pivotal connection for pivotal movement relative to said base member, whereby said pivoting of said cylinder relative to said base member from a centered position effects relative axial movement between said cylinder and said casing for effecting actuation of said liquid spring for biasing said self-centering spring assembly back to said centered position from which it was pivoted.

The present invention also relates to a self-centering spring assembly as set forth in the immediately preceding paragraph, and including axial movement means mounted on said cylinder for permitting a body mounted on said axial movement means to move toward and away from said first pivotal connection.

The present invention also relates to a self-centering construction comprising a base member, a platform, and a plurality of spring assemblies mounted between said base member and said platform, each of said spring assemblies comprising a liquid spring including a cylinder, first and second ends on said cylinder, a piston, a first portion of said piston in said cylinder, a second portion of said piston extending outwardly beyond said first end of said cylinder, a casing slidably mounted on said cylinder, a connection between said second portion of said piston and said casing, a cylinder extension on said cylinder extending beyond said first end of said cylinder, a base member, a first pivotal connection between said base member and each of said cylinder extensions, and a second pivotal connection on each of said casings located outwardly of said first pivotal connection for pivotal movement relative to said base member, said platform being connected to said cylinders, whereby said pivoting of said cylinders relative to said base member from centered positions effects relative axial movement between said cylinders and said casings for effecting actuation of said liquid springs for biasing said self-centering spring assemblies back to said centered positions from which they were pivoted to thereby bias said platform back to a centered position relative to said base member.

The present invention also relates to a self-centering construction comprising a base member, a platform, at least one spring assembly mounted between said base member and said platform, said spring assembly comprising a liquid spring including a cylinder, first and second ends on said cylinder, a piston, a first portion of said piston in said cylinder, a second portion of said piston extending outwardly beyond said first end of said cylinder, a casing slidably mounted on said cylinder, a connection between said second portion of said piston and said casing, a cylinder extension on said cylinder extending beyond said first end of said cylinder, a first pivotal connection between said base member and said cylinder extension, and a second pivotal connection on said casing located outwardly of said first pivotal connection for pivotal movement relative to said base member, whereby said pivoting of said cylinder relative to said base member from a centered position effects relative axial movement between said cylinder and said casing for effecting actuation of said liquid spring for biasing said self-centering spring assembly back to said centered position from which it was pivoted, said first pivotal connection comprising a ball joint, a second ball joint between said second end of said spring assembly and said platform, and at least one rigid link having opposite ends pivotally connected between said base member and said platform.

The present invention also relates to a self-centering construction comprising a base member, a platform, at least one spring assembly mounted between said base member and said platform, said spring assembly comprising a liquid spring including a cylinder, first and second ends on said cylinder, a piston, a first portion of said piston in said cylinder, a second portion of said piston extending outwardly beyond said first end of said cylinder, a casing slidably mounted on said cylinder, a connection between said second portion of said piston and said casing, a cylinder extension on said cylinder extending beyond said first end of said cylinder, a base member, a first pivotal connection between said base member and said cylinder extension, and a second pivotal connection on said casing located outwardly of said first pivotal connection for pivotal movement relative to said base member, whereby said pivoting of said cylinder relative to said base member from a centered position effects relative axial movement between said cylinder and said casing for effecting actuation of said liquid spring for biasing said self-centering spring assembly back to said centered position from which it was pivoted, said first pivotal connection comprising a ball joint, a second ball joint between said second end of said spring assembly and said platform, and at least one rigid link having opposite ends pivotally connected between said base member and said platform.

The various aspects of the present invention will be more fully understood when the following portions of the specification are read in conjunction with the accompanying drawings wherein:

BRIEF DESCRIPTION OF THE DRAWINGS

FIG. 1 is a side elevational view, partially in cross section, of the self-centering spring of the present invention in a centered position and mounted between a base and a member which it supports;

FIG. 2 is a view similar to FIG. 1 but showing the spring of FIG. 1 tilted from its centered position in response to an external force;

FIG. 3 is a cross sectional view taken substantially along line 3—3 of FIG. 2;

FIG. 4 is a fragmentary cross sectional view taken substantially along line 4—4 of FIG. 2;

FIG. 5 is an enlarged cross sectional view taken substantially along line 5—5 of FIG. 1 and showing the internal structure of the self-centering spring;

FIG. 6 is a cross sectional view similar to FIG. 5 but showing the spring in the tilted position of FIG. 2;

FIG. 6A is a fragmentary cross sectional view taken substantially along line 6A—6A of FIG. 6 and showing the slot in the liquid spring housing through which a pin secured to the outer housing passes;

FIG. 7 is a perspective view showing a plurality of self-centering springs of FIGS. 1–6 mounted between a base and a platform for the purpose of returning the platform to a position parallel to the base when forces applied to the platform are removed;

FIG. 7A is a schematic diagram showing the scope of movement of the platform of FIG. 7;

FIG. 8 is a plan view taken substantially in the direction of arrows 8—8 of FIG. 7 and showing the platform and the orientation of the self-centering springs relative thereto;

FIG. 9 is a perspective view of a modified form of the arrangement of FIG. 7 wherein a rigid link replaces one of the self-centering springs of FIG. 7;

FIG. 9A is a diagram of the scope of movement of the platform of FIG. 9;

FIG. 10 is a plan view taken substantially in the direction of arrows 10—10 of FIG. 9 and showing the orientations of the self-centering springs and the rigid link;

FIG. 11 is a perspective view of another orientation between a base and a supported member wherein the latter is supported by a single self-centering spring and the supported member is rigidly fixed to the upper end of the spring;

FIG. 12 is a plan view taken substantially along line 12—12 of FIG. 11;

FIG. 13 is a view, partially in cross section, taken substantially along line 13—13 of FIG. 11 and showing an universal joint at the base of the self-centering spring instead of the ball joint of FIGS. 1–6 so that the spring can only pivot about two axes without any rotational movement;

FIG. 13A is a diagram of the scope of movement of the spring of FIG. 13;

FIG. 14 is a cross sectional view taken substantially along line 14—14 of FIG. 13 and showing the universal joint and its relationship to the base;

FIG. 15 is a side elevational view, partially in cross section, taken substantially along line 15—15 of FIG. 16 and showing another embodiment of the present invention wherein universal joints are located at the base of the self-centering spring and also between the self-centering spring and the platform which it supports;

FIG. 16 is a perspective view showing the self-centering spring of FIG. 15 mounted between a base and a platform along with two rigid links which are pivotally connected between the base and platform;

FIG. 17 is a plan view taken substantially in the direction of arrows 17—17 of FIG. 16 and showing the orientation in plan between a self-centering spring and the rigid links;

FIG. 17A is a diagram showing the scope of movement of the platform of FIG. 17;

FIG. 18 is a cross sectional view taken substantially along line 18—18 of FIG. 15;

FIG. 19 is a fragmentary side elevational view, partially in cross section, of a self-centering spring which incorporates the features of FIG. 1 and also incorporates a tension-compression spring so that the supported platform is also resiliently supported in an axial direction;

FIG. 19A is a diagram showing the scope of movement of the self-centering spring of FIG. 19;

FIG. 20 is an expanded view partially in cross section taken substantially along line 20—20 of FIG. 19 and showing the construction of the tension-compression liquid spring portion of the self-centering spring of FIG. 19 which provides movement in an axial direction;

FIG. 21 is a cross sectional view of yet another embodiment of the present invention wherein a self-centering spring has an elastically deformable mounting therein to permit movement of the supported member in an axial direction;

FIG. 21A is a perspective diagram showing the scope of movement of the self-centering spring of FIG. 21;

FIG. 22 is a cross sectional view taken substantially along line 22—22 of FIG. 21 and showing the splined connection between the self-centering spring and the housing portion which supports a platform;

FIG. 23 is a cross sectional view taken substantially along line 23—23 of FIG. 21 and showing the rubber sleeve between the spring housing and the housing which supports the platform;

FIG. 24 is a side elevational view similar to FIG. 19 but showing an universal joint at the base rather than the ball joint of FIG. 19; and FIG. 24A is a perspective diagrammatic view of the scope of movement of the self-centering spring of FIG. 24.

DESCRIPTION OF THE PREFERRED EMBODIMENTS

One embodiment of a self-centering spring assembly is shown in FIGS. 1–6. The self-centering spring assembly 10 includes a liquid spring 11 having a cylinder 12 which contains a compressible liquid 13. A piston 14 has a first portion 15 located within the cylinder 12 and a second portion 17 located outside of the cylinder and a central portion 20 which passes through a suitable seal 21. A damping head 16 is mounted on the portion of piston 14 which is located within cylinder 12. The specific construction of liquid spring 11 is conventional, and it is only important relative to the present invention in that it forms a part of the combination of the self-centering spring assembly 10. A liquid spring of this type is fully described in U.S. Pat. No. 3,933,344, which is incorporated herein by reference.

A casing or sleeve 22 is slidably mounted on cylinder 12. In this respect, the outer portion 17 of piston 14 is suitably secured to cylindrical member 23, as by a screw 26, and member 23 is slidable within cylinder extension 24. A pin 25 extends through a bore 27 in block 23 and is rigidly held therein by screw 26 which passes therethrough. The ends of pin 25 extend through slots 29 in cylinder extension 24.

A ball joint is associated with cylinder extension 24. In this respect, a stem 30, having a ball 31 at one end, has its opposite end 32 threadably mounted in block 33 which is secured in cylinder extension 24 by threaded portion 34 which forms an end of block 33. Ball 31 is retained relative to base 35 by disc-shaped bracket or base member 37 which is secured to base 35 by a plurality of screws 39. A casing member in the form of a skirt 40 is threadably affixed to casing 22 at threaded connection 41. Skirt 40 has a depending annular portion 42 which has an annular bearing surface 43 which, when the self-centering spring assembly is in the centered position of FIG. 1, bears on the entirety of bearing surface 44 of bracket 37. Ball 31 is held within bracket 37 because of its contact with the partial spherical surfaces 45 and 46 of bracket 37 and base 35, respectively, which are in complementary mating engagement with ball 31 and which permit ball 31 to pivot in all directions relative to bracket 37 and base 35. A second ball 47 has a stem 49 which is threadably mounted in cup-shaped member 50 which in turn is threadably mounted onto the end 51 of cylinder 12. Ball 47 is retained between bracket 52 which is secured to a body or platform 53 by a plurality of screws 54 which are analogous to screws 39. Member 52 is disc-shaped like member 37. A nut 55 threadably secures ball 47 to bracket 52. Bracket 52 and nut 55 have partial spherical surfaces which are in complementary mating relationship to ball 47 so that their combination comprises a ball joint.

As can be seen from FIGS. 1–6, the distance between balls 31 and 47 remains constant at all times inasmuch as they are fixedly mounted relative to the cylinder 12 and cylinder extension 24, respectively. When the liquid spring assembly is in the centered position of FIGS. 1 and 5, the compressible liquid 13 in cylinder 12 is under compression by virtue of the fact that the piston 14 is maintained within a liquid compressing position by block 23 connected to casing 22 by pin 25. In other words, when the piston 14 is assembled with casing 22 by block 23, it is forced into cylinder 12 so that there is a compressive force in the liquid 13 which tends to bias piston 14 out of cylinder 12.

When the self-centering spring assembly 10 is in the centered position, the annular bearing surface 43 is in full contact with surface 44 of bracket or base member 37, and it is maintained in this position by virtue of the force of the compressed liquid 13 biasing piston 14 out of cylinder 12. When the self-centering spring assembly is moved out of positions 1 and 5 in any direction whatsoever, the skirt 40 will be moved to the positions such as shown in FIGS. 2 and 6 wherein only a portion of annular bearing surface 43 bears against the associated surface 44 of bracket 37. When this occurs, piston 14 will be forced from its position of FIG. 5 into cylinder 12, as shown in FIG. 6, thereby creating a greater compression within liquid 13 which in turn biases piston 14 outwardly of cylinder 12 with a greater force thereby tending to return the skirt 40 to the positions shown in FIGS. 1 and 5. The reason that the foregoing action occurs is because the distance between balls 31 and 47 is constant and the tilting action of the spring assembly from its centered position causes casing 22 to move toward ball 47 and, in doing so, it forces piston 14 into cylinder 12. When the external force tending to move the spring assembly 10 from a centered position is removed, the spring force exerted by liquid 13 on piston 14 will return the spring assembly to the centered position wherein annular bearing surface 43 will be in full contact with bracket surface 47.

A number of arrangements are shown in FIGS. 7–10 of how the spring assembly 10 of FIGS. 1–6 can be mounted between a base and a platform or body. More specifically, a base 35a is shown in FIGS. 7 and 8 supporting a body or platform 53a. There are three self-centering spring assemblies 10 positioned on a circle at 120° intervals. As can be visualized from FIG. 7A, platform 53a can move laterally in any direction, while remaining parallel to base member 35a. In other words, when an external force is applied thereto, platform 53a can experience rotational movement relative to base 35a or translational movement relative to base 35a or a combination of both. Under all conditions platform 53a will remain parallel to base 35a. When an external biasing force is removed from platform 53a which has moved the self-centering spring assemblies 10 from their centered positions, they will return to their centered positions, thereby bringing the platform 53a back to a centered position. It is to be noted that when the self-centering spring assemblies 10 move from the centered positions of FIG. 5 to the position of FIG. 6 a distance X, the platform 53 will move toward base 35 a distance Y, notwithstanding that the distance between balls 31 and 47 does not change.

In FIGS. 9 and 10 another arrangement utilizing a plurality of self-centering spring assemblies 10 is shown. In this embodiment platform 53b is supported on base 35b by two self-centering spring assemblies 10 and a rigid link 57 which has its opposite ends 59 and 60 pivotally connected by suitable pivotal connections to base 35b and platform 53b, respectively. Pivotal connections 59 and 60 have limited rotation in the direction that permits lateral motion. Accordingly, the same action will be obtained with the embodiment of FIGS. 9 and 10 as was described above relative to FIGS. 7 and 7A inasmuch as spring assemblies 10 will tend to return to a centered position after a biasing force is removed from platform 53b. As noted above, the length between balls 47 and 31 of the spring assemblies 10 remains constant during all pivotal movement of the spring assemblies 10. Likewise, the length between pivots 59 and 60 of rigid link 57 remains constant. Thus, the assemblage of FIGS. 9 and 10 operates in the same manner as the assemblage of FIGS. 7 and 8 without the necessity of utilizing a third self-centering spring assembly 10.

It will be appreciated also that under certain circumstances a single self-centering spring assembly 10 can be placed between a base, such as 35b, and a platform, such as 53b, when it is used with two rigid links, such as 57. In other words, an assembly can be made which is similar to FIGS. 9 and 10 but which uses two rigid links, such as 57, instead of the two spring assemblies 10 and it uses only one spring assembly 10 instead of the rigid link 57.

In FIGS. 11–14 another embodiment of the present invention is disclosed. The self-centering spring assembly 10a includes a liquid spring 11 having a cylinder 12 and a casing 22, all of which are identical to that described above relative to FIGS. 1–6, and like numerals designate identical elements of structure, thereby obviating the necessity to describe such structure in specific detail. The embodiment of FIGS. 11–14 differs only from that of FIGS. 1–6 in that there are no ball joints at opposite ends of cylinder 11 and its cylinder extension 24 (not shown). Instead, a bracket 61 is provided which is secured to a base member 62 by a plurality of screws 63. There is a universal joint connection 64 between bracket 61 and stem 30a which is analogous to stem 30 of FIGS. 1–6. A platform or body 65 is fixedly secured to the upper end of cylinder 12 as by a threaded connection 67. Therefore, platform 65 cannot pivot relative to the upper end of cylinder 12. The scope of action of self-centering unit 10a is shown in FIG. 13a which indicates that the assembly 10a can pivot in all directions but it cannot rotate about its longitudinal axis, as does the embodiment of FIGS. 1–6. Furthermore, the body or platform 65 will tilt as the self-centering spring assembly pivots, whereas in FIGS. 1–6 the platform or body remains parallel to the base.

In FIGS. 15–18 another embodiment of the present invention is disclosed wherein a self-centering spring assembly 10b is shown which includes a liquid spring 11 having a cylinder 12 and a casing 22 as described above relative to FIGS. 1–6. Identical numerals of FIGS. 1–6 and 11–13 and 15–18 will denote identical elements of structure, thereby obviating the necessity to describe such structure again in detail. The lower end of the self-centering spring assembly 10b is identical to that described above relative to FIGS. 11–13 and therefore the corresponding parts will be designated by identical numerals, thereby again obviating the necessity to describe such structure in detail. The embodiment of FIGS. 15–18 differs from the embodiment of FIGS. 11–14 only in that the upper end 67 of cylinder 12 carries a second universal joint 69 which is mounted in bracket 70 which is secured to body or platform 71 by a plurality of screws 72. Thus, this embodiment will have universal pivotal motion at its lower end by virtue of universal 64 and it will have universal pivotal motion at its upper end by virtue of universal 69. Therefore, as shown in FIG. 17A, the platform 71 can pivot in all directions relative to cylinder 12 and cylinder 12 can pivot in all directions relative to base 62 as the self-centering unit 10b is moved from its centered position of FIG. 15 when a biasing force is applied to platform or body 71. However, self-centering spring assembly 10b cannot pivot about its longitudinal axis.

In FIGS. 16 and 17 an arrangement is shown wherein a body or platform 71 is supported on a base 62 by a self-centering spring assembly 10b and a pair of rigid links 73 each having a full pivotal connection 74 at its lower end and a full pivotal connection 75 at its upper end. This arrangement will permit platform 71 to move laterally in all directions relative to base 62 but platform 71 cannot pivot about the axis of spring assembly 10b. In other words, the universals 64 and 69 prevent platform 71 from pivoting about an axis which is coincident with the longitudinal axis of spring assembly 10b.

In FIGS. 19–20 yet another embodiment of the present invention is disclosed wherein a self-centering spring unit 10c is shown which includes a liquid spring 77 which is operable in both tension and compression. A spring of this type is fully disclosed and described in U.S. Pat. No. 4,611,794 which is incorporated herein by reference, thereby obviating the necessity to describe this type of liquid spring in detail. The advantage of a liquid spring of this type is that the balls 47 and 31 can move toward and away from each other. In this embodiment, elements of structure which are identical to those of FIGS. 1–6 are denoted by identical numerals, thereby obviating the necessity to describe such structure relative to these figures. In this embodiment the cylinder 12 and cylinder extension (not shown) are identical to that shown in FIGS. 1–6. The only difference between FIGS. 1–6 and FIGS. 19–20 is that a liquid spring 77 which is operable in tension and compression has been mounted on the end of cylinder 12 by means of a threaded connection 78.

In the embodiment of FIGS. 19–20, the platform or body 53 can pivot in all directions relative to base 35, and/or it can move directly toward and away from base 35 in the direction of the longitudinal axis of the liquid spring unit 77, and it will return to its longitudinal original position after the external forces are removed. The self-centering liquid spring assembly of FIGS. 19–20 can thus be placed in association with a platform and base in the same orientations as set forth above relative to FIGS. 7–8 and FIGS. 9–10.

In FIGS. 21–23 a still further embodiment of the present invention is disclosed which not only possesses self-centering action but in addition permits movement between a platform or body 80 and a base 81 in a direction longitudinally of the axis of the self-centering spring assembly 10d. The spring assembly 10d includes parts of the embodiment of FIGS. 1–6 and parts of the embodiment of FIGS. 11–14, and like numerals of those figures will be used to designate like structure in the embodiment 10d to obviate the necessity of further detailed explanation. A liquid spring 11 is shown having a cylinder 12 and a piston 14, the outer end of which is secured to block 23 held by casing 22 by means of pin 25. A second casing 82 has its lower end threadably secured onto annular member 83 which is slidable on casing 22. A sleeve 84 has its end 85 threadably mounted on the upper end of cylinder 12. An annular elastomeric sleeve 87 is bonded between sleeve 84 and sleeve 82. Thus, there can be relative axial movement between sleeves 82 and 84 because of the elastomeric quality of sleeve 87 which is bonded therebetween. Thus, since sleeve 82 is fixed to cylinder 12 and sleeve 82 is movable relative to casing 22, sleeve 82 can move axially relative to cylinder 12, as limited by the resilience of elastomeric sleeve 87. Thus, when axial forces in the direction of arrows 89 are applied to platform 80, elastomeric sleeve 87 will elastically deform to permit the above-described longitudinal relative axial movement, and when the forces along axis 89 are removed, elastomeric sleeve 87 will return to its original position. It will also be noted that the universal joint 64 limits the rotational movement of cylinder 12 about its longitudinal axis but it permits the self-centering action to be effected in all directions. There is a splined connection at 89 between outer casing 82 and sleeve 85 which prevents relative rotational movement between sleeve 82 and sleeve 84.

In FIG. 24 a still further embodiment of the present invention is disclosed which includes structure shown in FIGS. 1–6 and FIGS. 11–14, and such structure will be designated by like numerals. In addition to the foregoing, the embodiment of FIG. 24 includes a liquid spring tension compression unit 77 which is shown and fully described in U.S. Pat. No. 4,611,794 which is incorporated herein by reference. The liquid spring unit 77 will permit the body or platform 90 to move toward and away from base 62 along the axis of the liquid spring unit 77 which can pivot in all directions because of the action of universal 64, but the self-centering spring assembly 10a cannot pivot about its longitudinal axis, as described above relative to FIGS. 11–14.

A plurality of liquid spring assemblies such as shown in FIGS. 21–23 can be mounted between a base and platform, as described above relative to FIGS. 7 and 8.

It can thus be seen that the various embodiments of the self-centering spring assemblies of the present invention are manifestly capable of achieving the above-enumerated objects, and while preferred embodiments of the present invention have been disclosed, it will be appreciated that the present invention is not limited thereto but may be otherwise embodied within the scope of the following claims.

What is claimed is:

1. A self-centering spring assembly comprising a liquid spring including a cylinder, first and second ends on said cylinder, a piston, a first portion of said piston in said cylinder, a second portion of said piston extending outwardly beyond said first end of said cylinder, a casing slidably mounted on said cylinder, a connection between said second portion of said piston and said casing, a cylinder extension on said cylinder extending beyond said first end of said cylinder, a base member, a first pivotal connection between said base member and said cylinder extension, and a second pivotal connection on said cylinder extension located outwardly of said first pivotal connection for pivotal movement relative to said base member, whereby said pivoting of said cylinder relative to said base member from a centered position effects relative axial movement between said cylinder and said casing for effecting actuation of said liquid spring for biasing said self-centering spring assembly back to said centered position from which it was pivoted.

2. A self-centering spring assembly as set forth in claim 1 wherein said first pivotal connection comprises a ball joint.

3. A self-centering spring assembly as set forth in claim 1 wherein said second pivotal connection comprises a casing member extending laterally outwardly from said casing, for bearing on a surface located laterally outwardly of said first pivotal connection.

4. A self-centering spring assembly as set forth in claim 3 wherein said first pivotal connection comprises a ball joint.

5. A self-centering spring assembly as set forth in claim 3 wherein said first pivotal connection comprises an universal joint.

6. A self-centering spring assembly as set forth in claim 3 wherein said casing member includes an annular portion having a bearing surface thereon.

7. A self-centering spring assembly as set forth in claim 1 wherein said piston connection comprises a pin affixed to and extending laterally of said second portion of said piston and attached to said casing.

8. A self-centering spring assembly as set forth in claim 7 wherein said cylinder extension includes openings through which said pin extends.

9. A self-centering spring assembly as set forth in claim 1 wherein said first pivotal connection between said base member and said cylinder extension comprises a first ball joint, and a second ball joint on said second end of said cylinder.

10. A self-centering spring assembly as set forth in claim 1 wherein said first pivotal connection between said base member and said cylinder extension comprises a first universal joint, and a second universal joint on said second end of said cylinder.

11. A self-centering spring assembly as set forth in claim 1 wherein said first pivotal connection between said base member and said cylinder extension comprises a universal joint, and a rigid connecting member on said second end of said cylinder for rigidly mounting an external member on said second end of said cylinder.

12. A self-centering spring assembly as set forth in claim 1 including axial movement means mounted on said cylinder for permitting a body mounted on said axial movement means to move toward and away from said first pivotal connection.

13. A self-centering spring assembly as set forth in claim 12 wherein said axial movement means includes a resilient sleeve mounted on said cylinder.

14. A self-centering spring assembly as set forth in claim 13 including a splined connection between said cylinder and said axial movement means.

15. A self-centering spring assembly as set forth in claim 14 wherein said first pivotal connection is a universal joint.

16. A self-centering spring assembly as set forth in claim 15 including a rigid connecting member on said axial movement means for mounting a body.

17. A self-centering spring assembly as set forth in claim 12 wherein said axial movement means comprises a second liquid spring operable in tension and compression.

18. A self-centering spring assembly as set forth in claim 12 wherein said axial movement means comprises a second sleeve mounted on said cylinder and positioned outwardly thereof, a second casing positioned outwardly of said second sleeve, and a resilient sleeve mounted between and affixed to said second sleeve and said second casing.

19. A self-centering construction comprising a base member, a platform, and a plurality of spring assemblies mounted between said base member and said platform, each of said spring assemblies comprising a liquid spring including a cylinder, first and second ends on said cylinder, a piston, a first portion of said piston in said cylinder, a second portion of said piston extending outwardly beyond said first end of said cylinder, a casing slidably mounted on said cylinder, a connection between said second portion of said piston and said casing, a cylinder extension on said cylinder extending beyond said first end of said cylinder, a first pivotal connection between said base member and said cylinder extension, and a second pivotal connection on said casing located outwardly of said first pivotal connection for pivotal movement relative to said base member, whereby pivoting of each of said cylinders relative to said base member from centered positions effects relative axial movement between said cylinders and said casings for effecting actuation of said liquid springs for biasing said self-centering spring assemblies back to said centered positions from which they were pivoted to thereby bias said platform back to a centered position relative to said base member, and axial movement means on each of said spring assemblies for permitting said second end of each of said cylinders to move toward and away from each of said first pivotal connections.

20. A self-centering construction as set forth in claim 19 wherein said axial movement means comprise a resilient sleeve between said cylinder and said casing.

21. A self-centering construction as set forth in claim 19 wherein said axial movement means comprises a second liquid spring operable in tension and compression on each of said liquid springs.

22. A self-centering construction comprising a base member, a platform, and a plurality of spring assemblies mounted between said base member and said platform, each of said spring assemblies comprising a liquid spring including a cylinder, first and second ends on said cylinder, a piston, a first portion of said piston in said cylinder, a second portion of said piston extending outwardly beyond said first end of said cylinder, a casing slidably mounted on said cylinder, a connection between said second portion of said piston and said casing, a cylinder extension on said cylinder extending beyond said first end of said cylinder, a first pivotal connection between said base member and each of said cylinder extensions, and a second pivotal connection on each of said casings located outwardly of said first pivotal connection for pivotal movement relative to said base member, said platform being connected to said cylinder, whereby said pivoting of said cylinders relative to said base member from centered positions effects relative axial movement between said cylinders and said casings for effecting actuation of said liquid springs for biasing said self-centering spring assemblies back to said centered position from which they were pivoted to thereby bias said platform back to a centered position relative to said base member.

23. A self-centering construction as set forth in claim 22 wherein said plurality of spring assemblies comprise three spring assemblies.

24. A self-centering construction as set forth in claim 23 wherein said first pivotal connection between said base member and said cylinder extension of each of said spring assemblies comprises a first ball joint, and a second ball joint on each of said spring assemblies between each of said second ends of said spring assemblies and said platform.

25. A self-centering construction as set forth in claim 24 wherein said plurality of spring assemblies comprise two spring assemblies, and a rigid link having opposite ends pivotally connected to said base member and said platform.

26. A self-centering construction as set forth in claim 25 wherein said rigid link and its pivotal connections is of a length which is substantially equal to the distance between said first and second ball joints of said spring assemblies.

27. A self-centering construction comprising a base member, a platform, at least one spring assembly mounted between said base member and said platform, said spring assembly comprising a liquid spring including a cylinder, first and second ends on said cylinder, a piston, a first portion of said piston in said cylinder, a second portion of said piston extending outwardly beyond said first end of said cylinder, a casing slidably mounted on said cylinder, a connection between said second portion of said piston and said casing, a cylinder extension on said cylinder extending beyond said first end of said cylinder, a first pivotal connection between said base member and said cylinder extension, and a second pivotal connection on said casing located outwardly of said first pivotal connection for pivotal movement relative to said base member, whereby said pivoting of said cylinder relative to said base member from a centered position effects relative axial movement between said cylinder and said casing for effecting actuation of said liquid spring for biasing said self-centering spring assembly back to said centered position from which it was pivoted, said first pivotal connection comprising a ball joint, a second ball joint between said second end of said spring assembly and said platform, and at least one rigid link having opposite ends pivotally connected between said base member and said platform.

28. A self-centering construction as set forth in claim 27 wherein said rigid link and its pivotal connections is of a length which is substantially equal to the distance between said first and second ball joints of said spring assembly.

29. A self-centering construction comprising a base member, a body, and a spring assembly mounted between said base member and said body, said spring assembly comprising a liquid spring including a cylinder, first and second ends on said cylinder, a piston, a first portion of said piston in said cylinder, a second portion of said piston extending outwardly beyond said first end of said cylinder, a casing slidably mounted on said cylinder, a connection between said second portion of said piston and said casing, a cylinder extension on said cylinder extending beyond said first end of said cylinder, a first pivotal connection between said base member and said cylinder extension, and a second pivotal connection between said casing and said base member, said second pivotal connection lying outwardly of said first pivotal connection, whereby said pivoting of said cylinder relative to said base member from a centered position effects relative axial movement between said cylinder and said casing for effecting actuation of said liquid spring for biasing said self-centering spring assembly back to said centered position from which it was pivoted, said first pivotal connection comprising an universal joint, and a rigid connection between said second end of said cylinder and said body.

30. A self-centering construction comprising a base member, a body, and a spring assembly mounted between said base member and said body, said spring assembly comprising a liquid spring including a cylinder, first and second ends on said cylinder, a piston, a first portion of said piston in said cylinder, a second portion of said piston extending outwardly beyond said first end of said cylinder, a casing slidably mounted on said cylinder, a connection between said second portion of said piston and said casing, a cylinder extension on said cylinder extending beyond said first end of said cylinder, a first pivotal connection between said base member and said cylinder extension, and a second pivotal connection between said casing and said base member, said second pivotal connection lying outwardly of said first pivotal connection, whereby said pivoting of said cylinder relative to said base member from a centered position effects relative axial movement between said cylinder and said casing for effecting actuation of said liquid spring for biasing said self-centering spring assembly back to said centered position from which it was pivoted, said first pivotal connection comprising a first universal joint, and a second universal joint between said second end of said cylinder and said body.

31. A self-centering construction as set forth in claim 30 including at least one rigid link having its opposite ends pivotally connected between said base member and said body.

32. A self-centering construction as set forth in claim 30 including a plurality of rigid links having their opposite ends pivotally connected between said base member and said body.

* * * * *